UNITED STATES PATENT OFFICE 2,311,878

METHOD OF ATTACHING HIGH CHROMIUM FERROUS ALLOYS TO OTHER METALS

Robert W. Schlumpf, Houston, Tex., assignor to Hughes Tool Company, Houston, Tex., a corporation of Delaware No Drawing. Application April 28, 1941, Serial No. 390,780

3 Claims. (Cl. 76—101)

My invention relates to a process of attaching objects composed of ferrous alloys, having therein a relatively high chromium content, to other metal objects.

It is desirable in the construction of various tools and devices, to form some of the parts of hard wear-resisting iron. Alloy irons containing a relatively high chromium content are particularly desirable for use where high resistance to abrasion is required. However, it is difficult or impossible from a practical standpoint to attach high carbon chromium alloy irons to other metal parts by welding or brazing. This fact interferes with the use of chromium iron alloys in situations where welding or brazing is necessary.

The hard iron alloys which are desirable for the use described normally contain elements other than chromium and iron. A desirable composition might include other elements approximately as follows:

| | Percent |
|---|---|
| Carbon | 1.5 to 4.5 |
| Manganese | 0.5 to 3.00 |
| Silicon | 0.5 to 3.0 |
| Chromium | 5.0 to 40.0 |

Other ingredients such as molybdenum, tungsten, nickel, vanadium, etc. might be present in amounts ranging from a trace to as high as 20.0%.

It is an object of this invention to overcome the usual difficulty experienced in securing ferrous tools of high chromium content in position during use. I desire to so form the alloy employed in constructing the tool or device that the brazing of the tool to other metal parts such as a shank, sleeve or holder may be accomplished in a satisfactory manner.

In carrying out my invention I have discovered that by the addition to such hard alloys of a certain proportion of boron, the resulting tool may be brazed securely to other metallic objects so that such tools may thus be secured in position.

It is necessary, therefore, to add to the desired constituents of the high chromium, high carbon wear-resisting tool or object a certain amount of boron. The desired amount of boron might be in proportion of one per cent of the total ingredients. When this proportion of boron is added to the other elements as above mentioned it is found that the resulting product may be readily brazed. Ordinarily in the addition of boron it has been found that from .5 of 1% to 2.5% will suffice. Thus a representative composition would be approximately as follows:

| | Percent |
|---|---|
| Carbon | 2.5 |
| Manganese | 1.00 |
| Silicon | 1.00 |
| Chromium | 20.00 |
| Molybdenum | 5.00 |
| Boron | 1.00 |
| Iron | Balance |

These elements, when fused together, are cast into the required shape to form the wear resisting tool which is desired. This tool may then be readily attached to other metal objects by brazing in the usual manner.

Without the addition of the boron element the high chromium content normally makes these alloys unavailable where it is necessary to braze to other metal parts. It is the general belief that refractory surface film existing on these metals of relatively high chromium content, in the absence of the element boron, interferes with the desired interface alloying action at the high temperature used for brazing operations. The addition of boron promotes a fluxing action which either prevents the formation of chromium compound film or removes it after it has been formed. There is evidence that at the brazing temperature, which in the case of copper would be between 2,000 and 2,100° F., the boron containing alloys cause a sweating or fusing at very small localized spots of high boron concentration and these fused spots oxidize to form boron compounds which are well known as fluxing agents.

By the addition of boron to wear-resisting high chromium ferrous parts which normally are difficult to braze, I am enabled by the usual method to form a brazing bond between the resulting object and the other metal parts by means of which said object may be secured in position. The advantages of my invention will therefore be obvious to those skilled in the art.

What is claimed as new is:

1. A process of securing in position a ferrous alloy object having therein approximately 20% of chromium comprising fusing with said alloy approximately 1% of boron and casting the alloy into the desired shape, then securing said casting to other metal objects by brazing.

2. The process of forming a wear resisting tool including fusing together a ferrous alloy containing 5% to 40% of chromium and approximately 2% of carbon, adding to the molten charge approximately 1% of boron, casting the metal into the desired shape to form the tool and securing said tool to a metal support by brazing.

3. In the forming of objects from ferrous alloys containing chromium and carbon, the improvement consisting of adding to the molten charge of said alloy approximately 1% of boron, casting the charge into the desired form and brazing the resulting object to a metal support.

ROBERT W. SCHLUMPF.